United States Patent [19]

Chun

[11] 4,273,158

[45] Jun. 16, 1981

[54] PRESSURE PULSE DAMPENING DEVICE

[75] Inventor: Hugh Chun, Hacienda Heights, Calif.

[73] Assignee: Greer Hydraulics, Incorporated, Chatsworth, Calif.

[21] Appl. No.: 37,387

[22] Filed: May 9, 1979

[51] Int. Cl.³ .............................................. F16L 55/04
[52] U.S. Cl. ..................................... 138/30; 137/207
[58] Field of Search ........................... 138/30; 137/207

[56] References Cited

U.S. PATENT DOCUMENTS

| | | | |
|---|---|---|---|
| 3,782,418 | 1/1974 | Zahid | 138/30 |
| 3,857,413 | 12/1974 | Zahid | 138/30 |
| 3,868,972 | 3/1975 | Zirps | 138/30 |
| 4,069,844 | 1/1978 | Zahid | 138/30 |
| 4,080,996 | 3/1978 | Zahid | 138/30 |

Primary Examiner—Steven L. Stephan
Attorney, Agent, or Firm—Arthur B. Colvin

[57] ABSTRACT

The invention relates to a pressure pulse dampener device to be used in association with a liquid conduit, said device comprising a pressure vessel having a movable partition therein defining two chambers, each having a port in communication therewith, one of the ports defining a gas port for charging of one of said chambers with gas under pressure and the other, a liquid port, said liquid port having a hollow fitting rigidly secured thereto, said fitting having an inlet port and an outlet port, the fitting having means therein defining a tortuous path for oil under pressure from said inlet port to said outlet port, the liquid port being valve controlled and being in communication with the tortuous path, the device being characterized by incorporating therein in the fluid conduit downstream of the outlet port, a valve controlled outlet through which the liquid may flow, the effective cross sectional area of the outlet being varied automatically responsive to the pressure in the hydraulic system.

8 Claims, 4 Drawing Figures

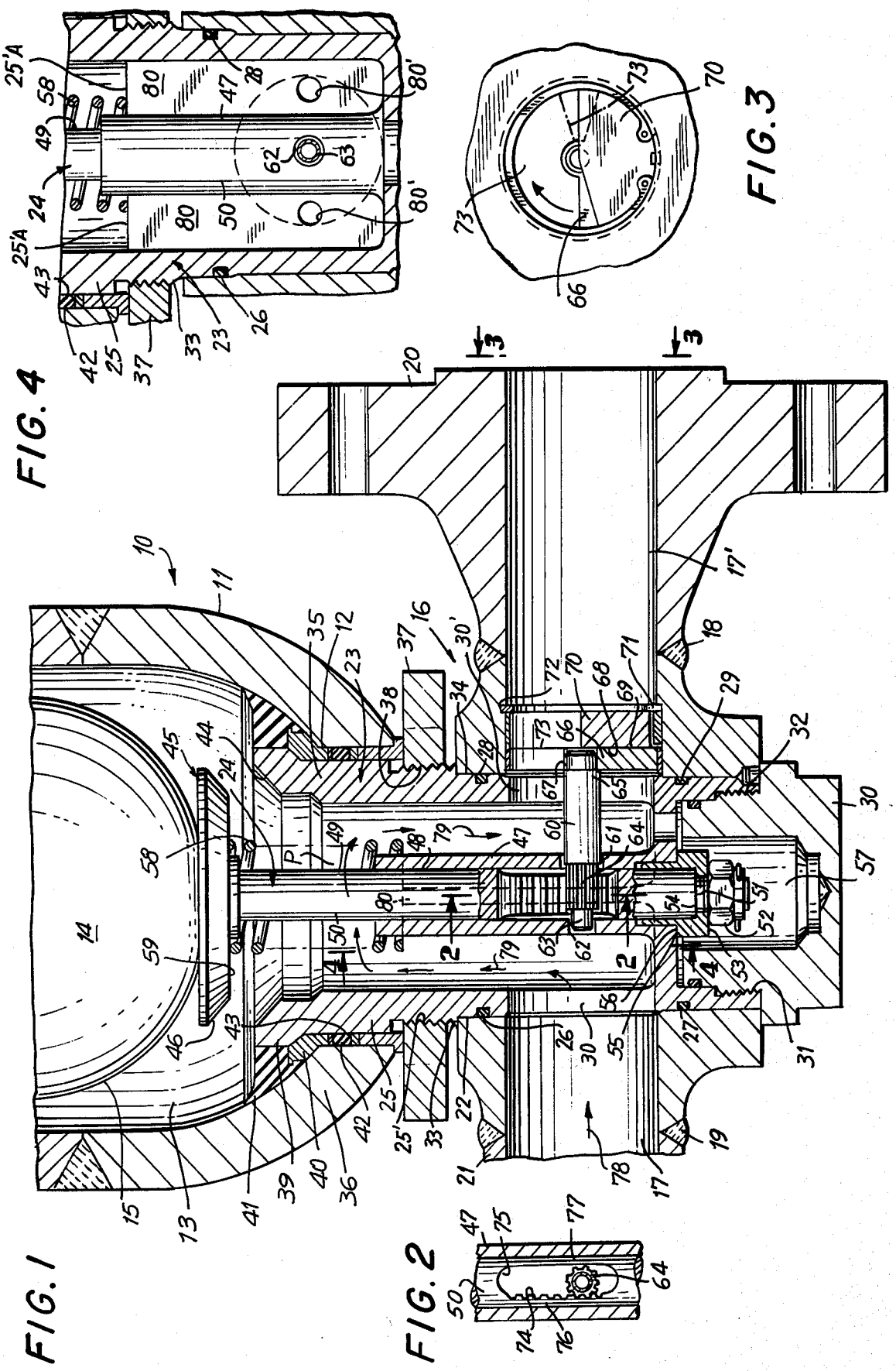

PRESSURE PULSE DAMPENING DEVICE

BACKGROUND OF THE INVENTION

1. Field of the Invention

The present invention is in the field of pulsation dampener devices.

2. The Prior Art

As conducive to an understanding of the invention, it is noted that where a hydraulic system or the like utilizes a reciprocating pump, such as a piston pump, pulses are generated. The frequency and amplitude of the pulses is dependent upon the number of pistons in the pump and its speed of operation.

Obviously, the pulses generated are transmitted through the system. If the amplitude of the pulses is sufficiently great, the transmitted shocks may induce damage in the various components of the system, such as the hydraulic lines, pipe fittings, valves, etc. Also, the uncontrolled pulses may cause leakage, breakage of lines and the like.

In order to reduce the shocks transmitted to the system, it is conventional to employ pulse dampener devices comprising, generally, a pressure vessel divided into two chambers of variable size by a bladder or like diaphragm. One of the chambers is charged with gas under pressure whereas the other chamber is in communication with the liquid, normally oil of the hydraulic system. As the liquid under pressure from the pump is forced into the oil chamber, the gas in the other chamber of the pressure vessel will be compressed, transferring energy to the gas and dampening the amplitude of the pulse. As examples of pulse dampeners of the type described, reference may be made to U.S. Pat. No. 3,782,418 of Jan. 1, 1974 and U.S. Pat. No. 3,857,413 of Dec. 31, 1974 in both of which a bypass path is provided for the passage of oil to reduce turbulence and hence reduce the pressure drop.

In the latter patent, manual control means are provided for increasing or decreasing the cross-sectional flow area of the by-pass path within the pulsation dampener device for the passage of oil in order to tune said turbulance reduction means based on the desired output characteristics of the system.

However, where the turbulence is reduced by increasing the flow area as set forth in U.S. Pat. No. 3,857,413, such adjustment may be effected only to provide correction to an average series of flow parameters. Thus, while the turbulence effect may be corrected based on a given pressure in the conduit upstream of the device and a given setting of the control means, it may be totally inappropriate if the pressure upstream of the device should drop below a predetermined amount.

SUMMARY OF THE INVENTION

The present invention may be summarized as directed to a pulsation dampener device of the general type disclosed in the above referenced patents, which is characterized in that a mechanism is provided for automatically varying the size of the flow passage through an outlet downstream of the outlet port in accordance with the difference between the gas chamber pressure and the hydraulic pressure at the inlet port present at any given time, whereby the pulsation dampening effect is optimized in accordance with the pressure then sensed.

More particularly, it has been found desirable to achieve maximum pulse dampening effect, that the flow-through outlet in the liquid conduit downstream of the pulsation dampener be reduced in size when the line pressure drops below a predetermined value, so that as the liquid port valve moves toward closed position, a maximum interaction or reflection back is assured of the oil flowing into the oil chamber of the dampener device past the closing valve to maximize the dampening even at lower line pressures. Conversely, where the line pressure is such as to compress the bladder so that the liquid port valve is fully opened, it is desirable that the flow passage through the outlet be as large as possible for maximum flow with minimum pressure drop.

It is accordingly an object of the invention to provide a pulsation dampener device having a flow regulator mechanism or choke which is responsive to the variations in the pressure in the oil line of a hydraulic system and which automatically varies the cross-sectional area of the flow passage outlet in a desired manner in accordance with the relation between the line pressure and the predetermined gas pressure in the bladder.

More particularly, the invention is directed to a pulsation dampener device including a pressure vessel divided into oil and gas chambers by a bladder and having an axially movable valve member mounted within the liquid port.

The valve member closes the liquid port when the pressure in the gas chamber exceeds the pressure in the hydraulic line and is shifted axially into the interior of the pressure vessel and unseated to open position when the pressure in the oil line exceeds that in the gas chamber, the degree of movement into the chamber being proportionate to the pressure differential.

The apparatus in accordance with the present invention couples the valve member with a valve controlled outlet interposed in the hydraulic line, whereby the size of the flow area through the outlet is dependent upon the position of the valve member. Normally, the outlet will be at its smallest size when the valve member is in fully closed position, the size of the outlet progressively increasing responsive to movement of the valve member toward fully open position.

Accordingly, it is a further object of the invention to provide a pulsation dampener device having a valve member for sealing the liquid port when the pressure in the gas chamber of the pressure vessel exceeds that in the hydraulic line, the valve member being operatively connected to means, such as a valve assembly or variable choke, for varying the cross-sectional area of the outlet of the pulsation dampener in accordance with the position of the valve member.

A further object of the invention is the provision of a pulsation dampener device, having means responsive to the differential between the pressure within the gas chamber of the device and that in the hydraulic line upstream of the location at which the device is connected to provide a relatively constant pulse dampening action.

Still a further object of the invention is the provision of a pulse dampener device of the type described wherein the pulse dampening effect is automatically optimized for any sensed pressure in the hydraulic system.

To attain these objects and such further objects as may appear herein or be hereinafter pointed out, reference is made to accompanying drawings, forming a part hereof, in which:

FIG. 1 is a fragmentary vertical sectional view through a pulsation dampener device in accordance with the invention;

FIG. 2 is a fragmentary section taken on the line 2—2 of FIG. 1;

FIG. 3 is an end elevational view taken in the direction of the arrows, 3—3 of FIG. 1, and FIG. 4 is a sectional view taken generally along line 4—4 of FIG. 1.

Referring now to the drawings, there is shown in FIG. 1 a pulsation dampener device 10 comprising an essentially conventional pressure vessel 11 having formed therein a liquid port 12. The pressure vessel, is formed of rigid metallic material and is divided into an oil chamber 13 and a gas chamber 14 by a resilient, expansible bladder member 15.

It will be understood that the chamber 14 is initially filled with gas, such as nitrogen gas, under a desired pre-charge pressure. In such circumstances, the bladder 15 expands essentially to line the interior of the pressure vessel.

The pressure vessel is connected to a housing assembly or casing 16 having a main passage 17 defining a conduit for hydraulic fluid under pressure. The housing 16 may be connected, as by welding at 18, 19 to fittings 20, 21 whereby the pulsation dampener device 10 may be interposed in the hydraulic line of a hydraulic assembly or system.

The housing 16 may, by way of example, include a vertically directed receiver bore 22 for the reception therein of the guide assembly 23 which slidably supports and guides a valve assembly 24. More particularly, the valve guide assembly 23 may include a cylindrical casting in the form of a sleeve 25, supported within the bore 22 in sealing engagement therewith, said sleeve 25 having transversely aligned openings, axially aligned with conduits 17, 17' and defining inlet port 30 and outlet port 30' respectively.

The sleeve 25 may include annular grooves 26, 27 carryings O-rings 28, 29, respectively, whereby a fluid-tight seal between the sleeve 25 and bore 22 is assured.

The sleeve 25 is locked in position by a hollow crown 30 externally threaded as at 31, the externally threaded portion being engaged with a complemental internally threaded area 32 formed within the lower end of the sleeve 25.

It will be understood that when the crown 30 is suitably tightened, an annular shoulder 33 is clamped against the edge of the circular orifice 34 at the upper surface of the housing 16 whereby the sleeve 25 is rigidly secured in position within the housing.

The upper end 35 of the sleeve 25 is rigidly secured to the lower end 36 of the pressure vessel.

Since the connection between the upper end 35 of the sleeve 25 and the pressure vessel forms no part of the present invention and may be accomplished illustratively in accordance with U.S. Pat. No. 3,782,418 a detailed description thereof is unnecessary. It is believed sufficient to note that a clamping nut 37 is threaded over the externally threaded portion 38 of the sleeve 25, which nut draws the enlarged annular portion 39 of sleeve 25 within the pressure vessel downwardly against split locking ring 40 bonded to annular elastomeric member 41. As a result of tightening of the locking nut 37, annular packing 42 is compressed, defining a tight seal in the area between the liquid port 12 and the cylindrical portion 43 of the sleeve 25.

A beveled valve seat 44 is defined at the upper end of the sleeve 25.

The valve assembly 24 includes an enlarged valve member or head 45 which is complementally beveled, as at 46, so as, in the lowermost or seated position, intimately to engage the valve seat 44.

The valve assembly 24 is guided for reciprocal movement axially of the pressure vessel 10 within a tubular guideway 47 positioned axially within the bore 25' of sleeve 25. The tubular guideway 47 includes a cylindrical interior guide bore 48 which closely fits and receives the cylindrical outer surface 49 of the valve stem 50 which extends axially from valve head 45.

The valve stem 50, adjacent its lowermost end is of reduced diameter and is externally threaded as at 51. A locking nut 52 screwed on end 51 clampingly retains an annular boss member 53 against a shoulder 54 defined by the reduced end 51. The boss 53 includes a radially directed shoulder 55 which abuts against the downwardly facing shoulder 56 formed on the lower end of the housing to limit inward movement of the valve member 45.

The crown nut 30 is provided with a hollow chamber 57 sized to permit axial movement of the lower end of the valve stem and its associated locking components described above.

A helical spring 58 is biased between the under surface 59 of the valve head 45 and the uppermost ends of radial walls or baffles 80 extending from tubular guideway 47 to the inner surface of bore 25'. The baffles 80 may be provided with by-pass passageways 80' therethrough to minimize turbulence as described in U.S. Pat. No. 3,782,418. The spring tends to urge the valve head, and hence, the stem, upwardly into the interior of the pressure vessel. It is to be noted that the upper edges 25' A of baffle 80 are positioned below the plane of the valve seat 44 to define a passageway P.

It will be further understood that in the normal operating condition in which the pressure within the gas chamber exceeds the pressure within the conduit 17 plus the force exerted by spring 58, the expanded bladder 15 will urge the valve head 45 downwardly to a seated position against the valve seat 44 against the expanding force of the spring 58, the passageway P still being open to permit flow of fluid from conduit 17 to 17'.

The pulsation dampener device as thus far described is essentially conventional and functions in the manner described in U.S. Pat. No. 3,782,418.

The automatic adjustment feature characterizing the pulsation dampener herein will now be described.

Automatic adjustment is provided through the use of an outlet 73 having associated flow control means which includes a shaft member 60 extending essentially axially of the conduit 17. The shaft is rotatably mounted within aperture 61 formed in the wall of the guideway 47.

The opposed wall of the guideway 47 is provided with an aperture 62 coaxially located with respect to the aperture 61, the aperture 62 rotatably receiving a reduced diameter portion 63 of the shaft 60.

A pinion gear 64 is formed, preferably integrally, on the shaft 60, for the purpose which will become apparent hereinafter.

The shaft 60, adjacent its downstream end 65 at the entrance to conduit 17' and illustratively in juxtaposition to outlet 30', carries a shutter member 66, which shutter member is keyed as by spline 67 for rotation with the shaft 60. The shutter member 66 is arcuate in configuration, comprising a part of a circle, illustratively less than 180°.

The downstream surface 68 of the shutter member 66 is disposed in abutting relation to the upstream face 69 of a stationary abutment member 70 which, like the shutter member, is arcuate and comprises a part of a circle, i.e., approximately a semi-circle and illustratively less than 180°. The abutment member 70 may be retained in position against movement in a down stream direction by snap washer 71 lying in annular groove 72 formed within the housing 16.

As will be apparent from a consideration of FIGS. 1 and 2, there is defined in the area 73 a restricted aperture or outlet formed by the non-overlapping portions of the fixed abutment 70 and the movable shutter 66.

It will be further appreciated that the effective size of the cross-sectional area 73 and, consequently, the resistance to flow through said area 73 is dependent upon the degree of overlap of the shutter 66 and abutment 70. In other words, where the arcuate segments 66 and 70 are disposed in overlapping relationship to a maximum extent, the flow passage 73 will be at a maximum. If, however, the shutter 66 is rotated, as by rotation of the shaft 60 in the manner hereinafter set forth, the solid portions of the shutter 66 and abutment 70 will be thrown out of register and fluid will be forced to flow only through a pie shaped opening defined between the shutter and the abutment.

It will be further appreciated that the size or arcuate extent of the pie shaped opening 73 will vary in accordance with the relatively rotated positions of the shutter and the abutment.

As hereinafter noted, it is desired that the size of the passage area 73 be at a maximum when the pressure in the conduit 17 is greatest and at a minimum when the valve head 45 is seated on the valve seat 44, which condition results when the pressure in the gas chamber 14 exceeds that in the conduit 17. It is important to note that the passage area 73 is never fully closed as this would cause excessive build-up of pressure upstream of the closed outlet 73 with possible damage to the pressure vessel and other components of the system. It has been found desirable to maintain the minimum size of flow area 73 such that the pressure drop across the outlet 73 never exceeds 500 P.S.I.

The desired movement of the shutter 66 is accomplished by engaging the pinion gear 64 with a rack formation 74 formed on the valve stem 50. To this end the valve stem 50 is provided with a through-going cutout 75 elongated in the direction of the axis of the valve stem. The rack formation 74 is formed on the wall 76 defining one edge of the cutout 75, the other wall 77 of the cutout being spaced sufficiently from the rack formation 74 to permit rotation of the pinion gear.

As will be evident from the drawings, movement of the valve stem 50 and the consequent upward and downward movement of the rack formation 74 will, by virtue of the meshed engagement of the gear with the rack formation, result in a concomitant rotation of shaft 60 carrying the shutter 66.

The operation of the device will be apparent from the foregoing description.

In the normally operative circumstances where pressure in the gas chamber 14 is sufficiently greater than the pressure of fluid moving in the conduit 17 over the baffles 80 in the direction of the arrows 79, plus the force exerted by spring 58, the valve head 45 will be in a lower substantially but not fully closed position (not shown) so that fluid may still flow into the oil chamber to react against the gas therein to dampen pulsations and the shaft 60 will then have been rotated in such manner that the solid portions of shutter 66 and abutment 70 overlap to a minimum extent, whereby the area 73 through which fluid may flow is at a minimum (see the dotted line position of the shutter, FIG. 3). Under the noted operating conditions, substantial resistance to flow through the area 73 is encountered.

As a result, the fluid flowing in the direction of the arrow 79, and which is forced to flow in the tortuous path shown by the arrows 79 as a result of the baffles 80 extending between the sides of the guideway 47 and the bore 25' of the sleeve 25, will be forced past the partially closed valve member 45 into the oil chamber 13, due to the reflecting influence of the partially shut or reduced size passage 73, whereby maximum dampening of pulsations will still be effected even when the line pressure has dropped.

In contradistinction, where line pressure in the conduit 17 and in the oil chamber 13 is sufficiently great to compress the bladder so that the valve head 45 will be moved to its maximum raised position above the seat 44, as shown in FIG. 1, the shutter member 66 will have been rotated in a counter clockwise direction to its maximum open position—see solid line, FIG. 3, whereby the passage 73 will be at a maximum size. As will be readily understood by those skilled in the art, when the valve 45 is in its fully open position, since hydraulic fluid is now free to flow through the liquid port and into the interior of the pressure vessel, whereat it may react against the bladder member directly, maximum dampening of high amplitude pulses is provided.

At interim positions wherein the valve head is partially raised from its seat, the shutter 66 will occupy an intermediate position relative to the abutment and the through passage 73 will be of an intermediate extent.

Since the unseating of the valve member 45 which controls the size of outlet 73 is related directly to the sensed differential pressure across valve member 45, there is thus provided, in accordance with the present invention, a pulse dampener device wherein the pulse dampening effect remains substantially constant even with variations in pressure, due to automatic variation in the size of outlet 73.

Numerous variations will occur to those skilled in the art in the light of the above description. Particularly, while there has been disclosed one means for opening or throttling the size of the outlet 73, i.e., a shutter rotating relative to a fixed abutment, it will be readily recognized that alternative expedients may be suitably employed without departing from the spirit of the invention.

In similar fashion, while the illustrated pulse dampener device functions in a manner wherein the size of the aperture is greatest when the sensed pressure is greatest, there may be applications wherein a converse relationship is desirable and increased pressure throttles and through-going opening.

Similarly, the means for controlling the outlet size, namely the rack and pinion, may likewise be varied as convenient, and the present invention is to be contemplated as encompassing such variations.

Accordingly, the invention is to be broadly construed within the scope of the appended claims.

Having thus described my invention, what I claim as new and desire to secure by Letters Patent of the United States is:

1. A pressure pulse dampener comprising a pressure vessel having a movable partition therein defining two chambers, each having a port in communication therewith, one of said ports defining a gas port for charging one of said chambers with gas under pressure, and the other an oil port, a housing associated with said pressure vessel, said housing including a transverse flow passage in communication with said oil port and a through flow passage connected with said transverse flow passage and having an inlet port and an outlet port adapted to be interposed in a hydraulic line, a hollow sleeve rigidly secured to said housing and extending into said vessel through said oil port, said sleeve having an upper end disposed within said vessel and defining a valve seat, said sleeve having transversely directed openings in alignment with said through flow passage, a valve member mounted for axial movement relative to said sleeve and including a head axially shiftable between closing and opening positions of said seat, and a stem disposed within said sleeve, a variable flow control valve in said through flow passage, and drive means operatively connecting said stem and said variable flow control valve for varying the effective area of said flow control valve responsive to movements of said valve stem within said sleeve.

2. Apparatus in accordance with claim 1 wherein said drive means comprises a shaft coupled to said stem for rotation responsive to axial movements thereof.

3. The combination set forth in claim 2 wherein said shaft includes a pinion member and said stem includes a rack in meshed engagement with said pinion member.

4. The combination set forth in claim 2 wherein said valve controlled outlet comprises a shutter fixed to said shaft, said shutter being positioned in variable blocking position of said outlet in accordance with the rotated position of said shaft.

5. The combination set forth in claim 4 wherein said valve controlled outlet comprises a stationary plate and said shutter is disposed adjacent said plate, said shutter variably overlapping said plate responsive to the rotated position of said shaft, thereby to vary the area of said outlet and its resistance to flow therethrough.

6. A pressure pulse dampener of the type which comprises a pressure vessel having a movable partition therein defining two chambers each having a port, one said port defining a gas charging port and the other said port defining an oil port, a housing associated with said vessel and including a through flow passage having inlet and outlet fittings at the terminal ends thereof for connection to a hydraulic line and a transverse passage extending axially of said vessel and connecting said oil port and through flow passage, a valve member within said vessel axially shiftable between opening and closing positions of said oil port, said valve member including a stem disposed within said transverse passage, a variable flow control valve member displaced from said transverse passage and disposed in said through flow passage, and drive means operatively connecting said valve stem and said variable flow and control valve member for varying the effective area of said through flow passage responsive to movements of said valve stem.

7. Apparatus in accordance with claim 6 wherein said control valve member comprises a shutter including a fixed compoent disposed in said through flow passage and a movable component in partial overlapping relation of said fixed component.

8. Apparatus in accordance with claim 6 wherein said drive means comprises a shaft and said shaft and valve stem include interconnecting means for rotating said shaft responsive to movements of said stem.

* * * * *